United States Patent [19]

Pringle

[11] 4,016,232
[45] Apr. 5, 1977

[54] PROCESS OF MAKING LAMINATED STRUCTURAL MEMBER

[75] Inventor: John Philip Pringle, Allen, Tex.

[73] Assignee: Capital Wire and Cable, Division of U.S. Industries, Plano, Tex.

[22] Filed: Feb. 10, 1975

[21] Appl. No.: 548,731

Related U.S. Application Data

[63] Continuation-in-part of Ser. No. 466,242, May 2, 1974, Pat. No. 3,956,541.

[52] U.S. Cl. .............................. 264/112; 264/122; 264/259
[51] Int. Cl.[2] ......................................... B29J 5/00
[58] Field of Search ........... 264/112, 115, 122, 259

[56] References Cited

UNITED STATES PATENTS

| | | | |
|---|---|---|---|
| 3,373,233 | 3/1968 | Rondum | 264/112 |
| 3,671,615 | 6/1972 | Price | 264/115 |
| 3,806,562 | 4/1974 | Lamort | 264/115 |

*Primary Examiner*—Robert F. White
*Assistant Examiner*—James R. Hall
*Attorney, Agent, or Firm*—Richards, Harris & Medlock

[57] ABSTRACT

A process for making a laminated structural member is disclosed in which the member is fabricated with one layer of sheet material such as plywood or fiberboard and an adjacent layer bonded thereto and formed from a mixture of scrap particles of thermoplastic wire and cable insulation, wood particles, comminuted paper, sawdust, and a suitable resin binder. The fabrication process is carried out by initially forming a mixture of reclaimed thermoplastic wire or cable insulation, a thermosetting binder, a wood-like filler, and a mold release agent. The mixture is then placed in a mold with the sheet material and subjected to heat and pressure to form a laminated structural member.

7 Claims, 3 Drawing Figures

PROCESS OF MAKING LAMINATED STRUCTURAL MEMBER

BACKGROUND OF THE INVENTION

The present application is a Continuation-in-Part of application Ser. No. 466,242, filed May 2, 1974, for Structural Member of Particulate Material and Method of Making Same, now U.S. Pat. No. 3,956,541.

This invention relates to the use of scrap electrical wire and cable materials, and more particularly, to improvements in the reclamation and use of the thermoplastic insulation materials of wires and cables. In addition, this invention relates to molded structural members, and more particularly, to improvements in laminated structural members molded from a mixture of particulate waste materials and a binder and sheet material.

In many situations, large quantities of wire and cable having metallic conductors surrounded by thermoplastic insulation materials such as polyvinyl chloride, polyethylene, or the like, must be removed or replaced. Often, these wires and cables cannot be reused and must be scrapped. In view of the value of the metals used in the conductors of these wires and cables, attempts have been made to reclaim and reuse these metals. In accordance with the prior art, the insulation from these wires and cables is normally removed by oxidation such as by combustion. Since there was no obvious reasonable commercial use for these insulation materials, their destructive removal from the valuable conductor metals was not challenged, and has been widely used.

In addition, numerous processes have heretofore been used wherein scrap particulate substances such as wood chips, sawdust, comminuted paper, and the like, have been combined with a thermosetting binder and subjected to heat and pressure to fabricate various structural members. The scrape materials used in the fabrication of these products have made them economical to produce and readily accepted for many uses, such as concrete forms, structural elements, molded products, cores for laminated panels, and the like. Theses members have excellent strength in compression, but are normally extremely brittle.

The prior art has recorded various attempts to improve the properties of these molded structural members, but these processes have either undesirably increased the production costs or have created other disadvantages in the members.

SUMMARY OF THE PRESENT INVENTION

In accordance with the present invention, it has been discovered that if scrap thermoplastic insulation materials from electrical cables and wires are shredded and added to particulate wood materials, substantial improvements can be obtained in the physical characteristics of structural elements molded from this mixture. In addition, if sheet material such as plywood, fiberboard, or the like is bonded to the mixture, further improvements in the strength and toughness of the structural member can be obtained.

More particularly, according to the present invention, a process for making an improved laminated structural member is disclosed whereby an improved laminated structural member is fabricated from sheet material and a mixture of particulate material. The sheet material can be plywood or heavy fiberboard from ⅛ to ½ inch thick. The particulate material is fabricated from a first mixture of from about 30 to 60 weight percent of shredded scrap thermoplastic wire and cable insulation and about 70 to 40 weight percent of filler material such as wood chips, comminuted paper and sawdust. Next, a second mixture is formed by adding about 11 to 18 weight percent of a phenolic resin binder and a small amount of zinc stearate mold release to the first mixture. The second mixture is placed in the mold with the sheet material and is pressed from 75 to 350 psi, preferably from about 150 to 250 psi and heated to a temperature in the range from 250° to 450° F., preferably from about 300° to 350° F. for eight to 20 minutes to form a molded structural member.

The resulting structural member is economical to produce and exhibits a substantial decrease in its brittleness compared to conventional members.

IN THE DRAWINGS

For a more complete understanding of the present invention, reference may be had to the following detailed description when taken in conjunction with the accompanying Drawings in which.

DESCRIPTION OF THE PREFERRED EMBODIMENTS

Figure 1:
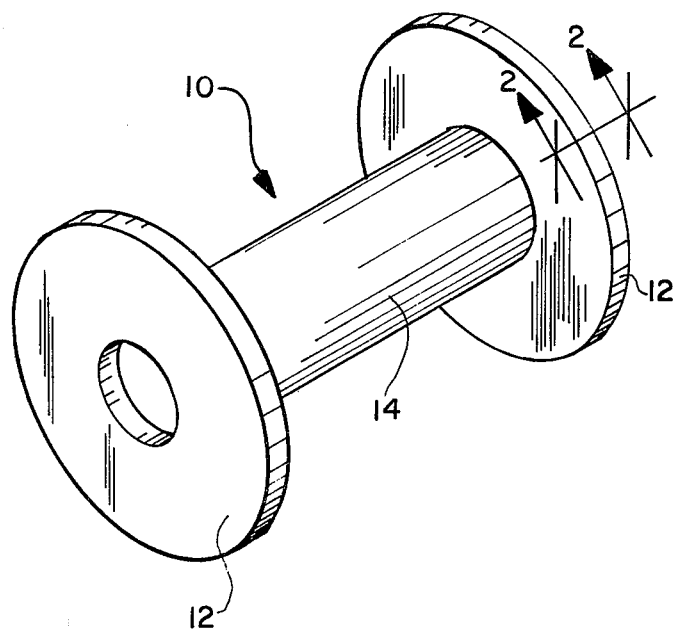
FIG. 1 is a perspective view of a cable reel.

Referring now to the Drawings wherein like reference characters designate like or corresponding parts throughout the several views, there is illustrated in FIG. 1, a cable reel 10 formed in accordance with the teachings of the present invention. It should be understood, of course, that the reel 10 is disclosed as an example to assist in describing the present invention, and that numerous other structural members or products could be fabricated in accordance with the teachings of the present invention.

The illustrated cable reel 10 has a pair of parallel flanges 12 and a barrel 14 about which a length of cable, or the like, may be wrapped. The barrel 14 of the reel 10 is normally formed from a corrugated core and the flanges 12 are formed from a rigid material.

Due to the fact that these reels are used to store and transport lengths of heavy electrical cable, and the like, the reels and especially the flanges thereon must be durable and be able to withstand bending loads.

To satisfy these needs, the present invention teaches the fabrication of these flanges (and other structural members with similar requirements) by laminating sheet material with a mixture of scrap materials so that the resultant product is inexpensive to produce and more durable than conventional products.

To form the flanges 12 of the present invention, large quantities of scrap cable and wire having thermoplastic insulation thereon, such as polyvinyl chloride, polyethylene, or the like, is cut into small lengths and placed in a hammer mill for shredding. The material is then forced through a quarter-inch grid grate to remove the insulation materials from the conductors. Thereafter, the insulation materials are separated from the metallic conductor materials by an air and gravity separator.

After separation of the insulation particles, the particles have an average size of about an eighth of an inch, but can range up to one-half inch maximum dimension. Preferably an excess of 50% of the total thermoplastic particles by weight are in the range of 1/16 to 1/4 maximum dimension. Because the particles are formed in a hammer mill, the particle size is random, but it is to be understood, of course, that the primary quantity of the particles will have the average one-eighth inch greater dimension.

The particulate insulation material is next combined to form a first mixture with a filler material such as wood scrap material which can comprise wood chips, comminuted paper, sawdust, and the like. This wood scrap material can be formed by passing larger pieces of wood and scraps through a grinder and using the resultant product therefrom. The size of the wood filler can range from sawdust to larger splinters, and the like. Preferably an excess of 50% of the total wood fiber particles by weight are in the range of 1/8 to 3/8 maximum dimension. In either case, the particles of thermoplastic insulation and filler are limited in maximum size only by practical considerations of molding and handling of the particles. It is to be understood, of course, that preferably the particles can be no larger than the minimum dimensions of the member to be molded or than can be handled by the molding equipment.

This first mixture is then combined with a suitable thermosetting binder to form a second mixture. The thermosetting binder may be selected from the conventional thermosetting materials available such as, phenolic resin, ureaformaldehyde, or the like. In addition, a mold release material may be added to the mixture. The mold release agent is completely conventional and may be, for example, zinc sterate, calcium stearate, or the like.

Next, a layer of sheet material such as plywood or heavy fiberboard of a thickness in the range of 1/8 to 1/2 inch is cut to conform to the cross-sectional shape of the reel flange 12 and is placed in a mold along with the above mixture and is subjected to heat and pressure to fabricate a laminated flange 12.

The resulting flange 12 is flexible when compared to ordinary particle boards and is more durable. It is also inexpensive in that scrap wood and particles of scrap cable insulation form a primary portion of the material. The improved strength and durability of the fabricated material is believed to be a result of the unique lamination of sheet material with the combination of the particulate thermoplastic insulation material with the wood particles. It is believed that the thermoplastic insulation material softens and melts to form discrete plastic zone within the material which conforms and bonds to adjacent particles under the heat and pressure of the fabrication process. This adds flexibility to the structural members formed in this manner.

Figures 2, 3:
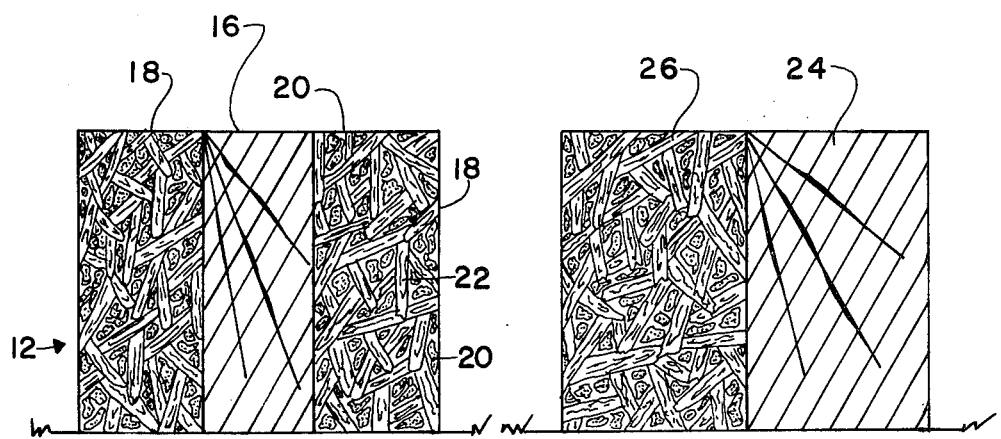
FIG. 2 is an enlarged partial section of one embodiment of a flange of the reel fabricated in accordance with the present invention and taken on line 2—2 of FIG. 1, looking in the direction of the arrows.
FIG. 3 is a view similar to FIG. 2 of an alternative embodiment of the present invention.

A cross section of one embodiment of the flange 12 is illustrated in FIG. 2 wherein the sheet material 16 is laminated between two layers 18 of mixture containing thermoplastic material. In FIG. 2, the discrete zones 20 of thermoplastic insulation material are shown dispersed within the wood particles 22, and the like. The formation of the discrete zones 20 of thermoplastic material is important, and it is believed that these zones flex readily to increase the flexibility of the flanges 12.

In this regard, it is believed important that the particles of thermoplastic material must be large enough to form these discrete zones 20 in the finished product. Although the optimum particle size has not been determined, it is known that particles randomly formed with an average maximum dimension of one-eighth of an inch function well.

More specifically, the material of a flange 12, one inch thick can be fabricated by initially forming a first mixture which comprises preferably from about 30 to 60 weight percent of the particulate thermoplastic scrap from discarded wire cable insulation with preferably from about 70 to 40 weight percent of filler material such as wood chips, comminuted paper and sawdust. The plastic material has an average maximum dimension particle size of one-eighth of an inch. Next, a second mixture is formed by adding from about 11 to 18 weight percent base material of a phenolic resin binder and a small amount of zinc stearate mold release agent to the first mixture.

The resultant second mixture will thus comprise about 27 to 51 percent by weight of thermoplastic material, about 34 to 63 percent by weight of filler material, 10 to 15 percent by weight of binder and a small amount of mold release agent.

This second mixture is then placed in a mold with a layer of sheet material which comprises plywood 1/4 to 1/2 inch thick, and preferably 3/8 inch thick, The material in the mold is then pressed at about 150 to 250 psi and heated to a temperature in the range of 300° to 350° F. for eight to twenty minutes to form a laminated molded cable flange in accordance with the present invention.

Exemplary of a particular preferred specific embodiment is the use of 3/8 inch thick plywood with a mixture of 13 weight percent standard phenolic molding resin; 18 weight percent of scrap particulate thermoplastic cable insulation with an average greater dimension of one-eighth of an inch; 69 weight percent of wood filler material with an average greater dimension of one-half inch; and a small amount of zinc stearate mold release agent which is molded at 350° F. for 18 minutes at a pressure of 150 psi.

The thermoplastic scrap may be of any kind used for insulation, of which polyvinyl chloride, polyethylene, and the like, are most common.

Experiments have been conducted within the range specified which determined that the higher the percentage of plastic scrap material added to the composition, the more flexible the resultant products will be. The lower the percentage of the plastic insulation materials, the less flexible the materials will be.

It is important to recognize that a significant aspect of the present invention is that the improved particle board of the present invention could be formed in accordance with the teachings of the present invention by use of thermoplastic materials derived from other sources than from the reclamation of the insulation of the electrical wires and cables. It is also important to recongnize that another significant aspect of Applicant's invention is the provision of a reasonable commercial use for the insulation from wires and cables to produce an improved product.

In FIG. 3, an alternative embodiment of the present invention is illustrated. In this embodiment, the sheet material 24 is positioned adjacent to the mixture 26 of scrap materials. It is to be understood that the relative position of the mixture 26 and material 24 can be selected as desired.

It is to be understood, of course, that the foregoing disclosure relates only to one specific embodiment and that the invention could be practiced to form many structural members. It is also to be understood that alternations and modifications could be made without departing from the spirit and scope of the invention as set forth in the appended claims.

What is claimed is:

1. A process for forming a flexible laminated structural member comprising:
   a. admixing from about 30 to about 60 weight percent of particulate thermoplastic material wherein at least 50 percent of the particles have a particle dimension of from about 1/16 inch to about ¼ inch with from aout 70 to about 40 weight percent of a particulate wood filler material to form a first mixture;
   b. admixing from about 11 to about 18 weight percent of a thermosetting binder, based upon the weight of the first mixture, to the first mixture to form a resultant mixture;
   c. placing a sheet material having at least one surface into a mold;
   d. placing an effective amount of the resultant mixture into the mold adjacent to at least one of the surfaces of the sheet material to cover the surface to a desired depth; and
   e. heating and compressing the resultant mixture and the sheet material at a temperature in the range from about 250° F. to about 450° F. and at a pressure from about 75 psi to about 350 psi for a period of time effective to enable the particulate thermoplastic material to form flexible discrete zones whereby the discrete zones bond together and said resulant mixture bonds to said sheet material to form a flexible laminated structural member.

2. The process of claim 1 wherein the particulate thermoplastic material is scrap thermoplastic wire and cable insulation and at least 50 percent by weight of the particulate thermoplastic material has an average particle dimension of ⅛ inch.

3. The process of claim 1 wherein at least 50 percent by weight of the particulate wood filler material has a particle dimension from about ⅛ inch to about ⅜ inch.

4. The process of claim 1 wherein the sheet material is provided with a thickness from about ¼ inch to about ½ inch and the sheet material is selected from a group consisting of fiberboard and plywood.

5. The process of claim 4 wherein the resultant mixture comprises from about 27 to about 51 weight percent particulate thermoplastic material, from about 34 to about 63 weight percent wood filler material, from about 10 to about 15 weight percent thermosetting binder, and an effective amount of a mold release agent to aid, after the heating and compressing step, in removing the resultant mixture from the mold.

6. The process of claim 5 wherein said thermosetting binder is a phenolic resin.

7. The process of claim 6 wherein said sheet material has a thickness of about ⅜ inch and said heating and compressing is carried out at a temperature in the range of from about 300° F. to about 350° F. and at a pressure of from about 150 psi to about 250 psi for a period of time of from about 8 minutes to about 20 minutes.

* * * * *

UNITED STATES PATENT OFFICE
CERTIFICATE OF CORRECTION

Patent No. 4,016,232     Dated April 5, 1977

Inventor(s) John Philip Pringle

It is certified that error appears in the above-identified patent and that said Letters Patent are hereby corrected as shown below:

Column 1, line 43/44, "The-ses" should be --These--.

Column 3, line 35, "sterate" should be --stearate--;
          line 53, "zone" should be --zones--.

Column 4, line 10, "about70" should be --about 70--;
          line 25, "thick," second occurrence should be --thick.--

Column 5, line 12, "aout" should be --about--.

Signed and Sealed this nineteenth Day of July 1977

[SEAL]

Attest:

RUTH C. MASON
Attesting Officer

C. MARSHALL DANN
Commissioner of Patents and Trademarks